(12) United States Patent
Bjerke et al.

(10) Patent No.: US 9,497,138 B2
(45) Date of Patent: *Nov. 15, 2016

(54) MANAGING CAPACITY IN A DATA CENTER BY SUSPENDING TENANTS

(71) Applicant: Microsoft Corporation, Redmond, WA (US)

(72) Inventors: Marshall Scot Bjerke, Bellevue, WA (US); Robert Tobkes, Seattle, WA (US); Bryan David Cooke, Bellevue, WA (US); Andrew Robert Miller, Sr., Issaquah, WA (US); Jonathan Wayne Phillips, Seattle, WA (US); Alexander M. Tkatch, Sammamish, WA (US); David R. Shutt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/490,217

(22) Filed: Sep. 18, 2014

(65) Prior Publication Data

US 2015/0006738 A1 Jan. 1, 2015

Related U.S. Application Data

(63) Continuation of application No. 13/293,097, filed on Nov. 9, 2011, now Pat. No. 8,843,609.

(51) Int. Cl.
*G06F 15/16* (2006.01)
*H04L 12/911* (2013.01)
(Continued)

(52) U.S. Cl.
CPC ............... *H04L 47/70* (2013.01); *G06F 8/60* (2013.01); *G06F 9/00* (2013.01); *G06F 9/445* (2013.01); *G06F 9/5072* (2013.01); *G06F 9/5077* (2013.01); *G06F 9/5083* (2013.01); *G06F 17/30* (2013.01); *H04L 29/08* (2013.01); *H04L 67/1008* (2013.01); *H04L 67/1027* (2013.01);
(Continued)

(58) Field of Classification Search
USPC .............................. 709/223, 226, 228; 718/1
See application file for complete search history.

(56) References Cited

U.S. PATENT DOCUMENTS 6,606,627 B1  8/2003  Guthrie et al.
6,990,666 B2  1/2006  Hirschfeld et al.
(Continued)

FOREIGN PATENT DOCUMENTS

CN           1777872 A      5/2006

OTHER PUBLICATIONS

Chinese Official Action dated Sep. 25, 2014 in Chinese Application No. CN 201210445077.0.
(Continued)

*Primary Examiner* — Kyung H Shin
(74) *Attorney, Agent, or Firm* — Damon Rieth; Danielle Johnston-Holmes; Micky Minhas

(57) ABSTRACT

A tenant comprising one or more users receives services from a cloud computing system ("CCS"). The CCS determines when a tenant is not using any services, and if so, the CCS initiates a tenant suspension process. The tenant suspension process involves suspending various asynchronous computing processes for the tenant, which execute otherwise execute even if no users of the tenant are currently accessing the CCS. After a period of non-use of the CCS, the tenant is suspended. The tenant is returned to an active state automatically when a user of the tenant logs-on to receive services.

18 Claims, 6 Drawing Sheets

(51) Int. Cl.
*H04L 29/08* (2006.01)
*G06F 9/00* (2006.01)
*H04L 29/06* (2006.01)
*G06F 9/445* (2006.01)
*G06F 17/30* (2006.01)
*G06F 9/50* (2006.01)
*G06F 9/455* (2006.01)

(52) U.S. Cl.
CPC .......... *H04L 67/1031* (2013.01); *H04L 67/42* (2013.01); *H04L 69/329* (2013.01); *G06F 9/455* (2013.01); *G06F 9/505* (2013.01); *H04L 67/10* (2013.01); *H04L 67/1002* (2013.01); *H04L 67/22* (2013.01)

(56) References Cited

U.S. PATENT DOCUMENTS

| | | |
|---|---|---|
| 6,993,657 B1 | 1/2006 | Renner et al. |
| 7,100,195 B1 | 8/2006 | Underwood |
| 7,987,167 B1 | 7/2011 | Kazar et al. |
| 7,996,525 B2 | 8/2011 | Stienhans et al. |
| 8,190,740 B2 | 5/2012 | Stienhans et al. |
| 2002/0049608 A1 | 4/2002 | Hartsell et al. |
| 2002/0049841 A1 | 4/2002 | Johnson et al. |
| 2002/0133392 A1 | 9/2002 | Angel et al. |
| 2003/0051021 A1* | 3/2003 | Hirschfeld et al. ........... 709/223 |
| 2003/0051195 A1 | 3/2003 | Bosa et al. |
| 2003/0088616 A1 | 5/2003 | Etessami et al. |
| 2003/0212654 A1 | 11/2003 | Harper et al. |
| 2004/0073786 A1 | 4/2004 | O'Neill et al. |
| 2004/0117220 A1 | 6/2004 | Chess et al. |
| 2005/0049937 A1 | 3/2005 | Sanders |
| 2005/0182745 A1 | 8/2005 | Dhillon et al. |
| 2005/0188345 A1 | 8/2005 | Chang et al. |
| 2005/0283478 A1 | 12/2005 | Choi et al. |
| 2006/0059035 A1 | 3/2006 | Kraft et al. |
| 2006/0069717 A1 | 3/2006 | Mamou et al. |
| 2006/0178918 A1 | 8/2006 | Mikurak |
| 2006/0195476 A1 | 8/2006 | Nori et al. |
| 2006/0247944 A1 | 11/2006 | Calusinski et al. |
| 2007/0067354 A1 | 3/2007 | Mullender et al. |
| 2007/0130137 A1 | 6/2007 | Oliver et al. |
| 2007/0156902 A1 | 7/2007 | Becker |
| 2007/0162537 A1 | 7/2007 | Juncker |
| 2008/0040335 A1 | 2/2008 | Gatti et al. |
| 2008/0086479 A1 | 4/2008 | Fry et al. |
| 2008/0270459 A1 | 10/2008 | Grewal et al. |
| 2009/0049056 A1 | 2/2009 | Shutt et al. |
| 2009/0288084 A1 | 11/2009 | Astete et al. |
| 2009/0293056 A1* | 11/2009 | Ferris ............................... 718/1 |
| 2010/0169489 A1 | 7/2010 | Akiyama et al. |
| 2011/0131335 A1* | 6/2011 | Spaltro et al. ................ 709/228 |
| 2011/0161696 A1 | 6/2011 | Fletcher |
| 2011/0185208 A1 | 7/2011 | Iwamoto et al. |
| 2011/0231680 A1 | 9/2011 | Padmanabhan et al. |
| 2011/0252137 A1 | 10/2011 | Stienhans et al. |

OTHER PUBLICATIONS

U.S. Notice of Allowance dated Dec. 17, 2014 in U.S. Appl. No. 12/147,588.
U.S. Official Action dated Jul. 15, 2010 in U.S. Appl. No. 11/789,993.
U.S. Official Action dated Jan. 4, 2011 in U.S. App. No. 11/789,993.
U.S. Official Action dated Jun. 23, 2011 in U.S. Appl. No. 11/789,993.
U.S. Official Action dated Oct. 21, 2011 in U.S. Appl. No. 11/789,993.
U.S. Official Action dated Oct. 21, 2010 in U.S. Appl. No. 12/147,588.
U.S. Official Action dated Feb. 28, 2011 in U.S. Appl. No. 12/147,588.
U.S. Official Action dated Sep. 12, 2011 in U.S. Appl. No. 12/147,588.
U.S. Official Action dated Jan. 26, 2012 in U.S. Appl. No. 12/147,588.
U.S. Official Action dated Oct. 24, 2013 in U.S. Appl. No. 12/147,588.
U.S. Official Action dated Apr. 16, 2014 in U.S. Appl. No. 13/293,097.
U.S. Official Action dated Aug. 30, 2013 in U.S. Appl. No. 13/293,097.
U.S. Official Action dated Dec. 19, 2013 in U.S. Appl. No. 13/293,097.
International Search Report dated May 7, 2013 in International Application No. PCT/US12/064007.
Chong et al. "Building Distributed Applications: Architecture Strategies for catching the long Tail," Apr. 2006, Microsoft Corporation, 20 pp.
Clifton et al., "Privacy Preserving Data Integration and Sharing", 2004, Proceedings of the 9th ACM SIGMOD workshop on Research issues in data mining and knowledge discovery, Paris, France, 2004, pp. 19-26.
Kim et al., "A Distributed Object-Oriented Database System Supporting Shared and Private Databases," Jan. 1991, ACM Transactions on Information Systems (TOIS), 9(*1*):31-51.
India's First Multi-Tenant, Multi-Utility Software-as-a-Service Platform, Published on: Apr. 28, 2008, Available at: A2ZApplications.com, 3 pp.
Multitenant Platforms, Published on: Apr. 28, 2008, Available at: salesforce.com, 2 pp.
Vmware vSphere, Published on: Aug. 26, 2011, Available at: http:www.vmware.com/prodicys/drs/features.html, pages.
Urgaonkar et al., "Dynamic Resource Allocation and Power Management in Virtualized Data Centers," Apr. 2010, Proc. IEEE/IFIP NOMS, 8 pages.
"CloudShare ProPlus FAQs," Published on: Aug. 26, 2011, Available at: http://www.cloudshare.com/Products/CloudShare-ProPlus/FAQ.aspx, 12 pages.
Translated Chinese Office Action mailed Jun. 9, 2015 for Chinese patent application No. 201210445077.0, a counterpart foreign application of U.S. Appl. No. 13/293,097, 6 pages.

* cited by examiner

MANAGING CAPACITY IN A DATA CENTER BY SUSPENDING TENANTS

CROSS REFERENCE TO RELATED APPLICATIONS

This application is continuation of co-pending U.S. application Ser. No. 13/293,097 filed Nov. 9, 2011 entitled "Managing Capacity in a Data Center by Suspending Tenants" which is expressly incorporated herein by reference.

BACKGROUND

Cloud based computing data centers offer the advantage of providing low cost computing services by taking advantage of economies of scale. Many thousands of users can be served by a data center, and managing capacity is important to ensure that the computing resources are efficiently used. This requires identifying when resources are not being effectively used, and managing the use of these resources in a responsive and timely manner. It is with respect to these and other considerations that the disclosure made herein is presented.

SUMMARY

Concepts and technologies are described herein for conserving resources in a cloud computing system ("CCS") when a tenant of the CCS is not using services. In one embodiment disclosed herein, a method for conserving computing resources in a CCS includes initiating at least one administrative computing process for a tenant in the CCS, determining that no user of the tenant has used the CCS within a period of time, and waiting for the at least one administrative computing process for the tenant in the CCS to complete. The method further includes indicating the tenant as suspended in the CCS and receiving a log-on request from a user of the tenant. The method also includes determining that the tenant is suspended and allowing the at least one administrative computing process for the tenant to be reinitiated.

In another embodiment disclosed herein, a computer readable storage medium stores computer-executable instructions thereon which, when executed by a computer, cause the computer to initiate an asynchronous computing process for a tenant in a CCS, determine that no user of the tenant has used the CCS within a period of time, and wait for the asynchronous computing process for the tenant in the CCS to complete execution. The instructions further cause the computer to indicate the tenant in a tenant state table as being in a suspended state in the CCS and receive a log-on request from a user of the tenant. The instructions further cause the computer to determine that the tenant is indicated as in the suspended state in the tenant state table and allow the at least one asynchronous computing process for the tenant to execute.

In another embodiment disclosed herein, a system for conserving computing resources includes a processor configured to initiate at least one administrative computing process for a tenant in a CCS and to determine that no user of the tenant has used the CCS within a period of time. The processor is further configured to wait for the at least one administrative computing process for the tenant in the CCS to complete, indicate the tenant as suspended in a tenant state table stored in the CCS, receive a log-on request from a user of the tenant, and determine that the tenant is suspended by retrieving a tenant state table stored in the CCS. The processor is further configured to allow the at least one asynchronous computing process for the tenant to be reinstated in response to the log-on request from the user, and indicate the tenant as active in the tenant state table.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
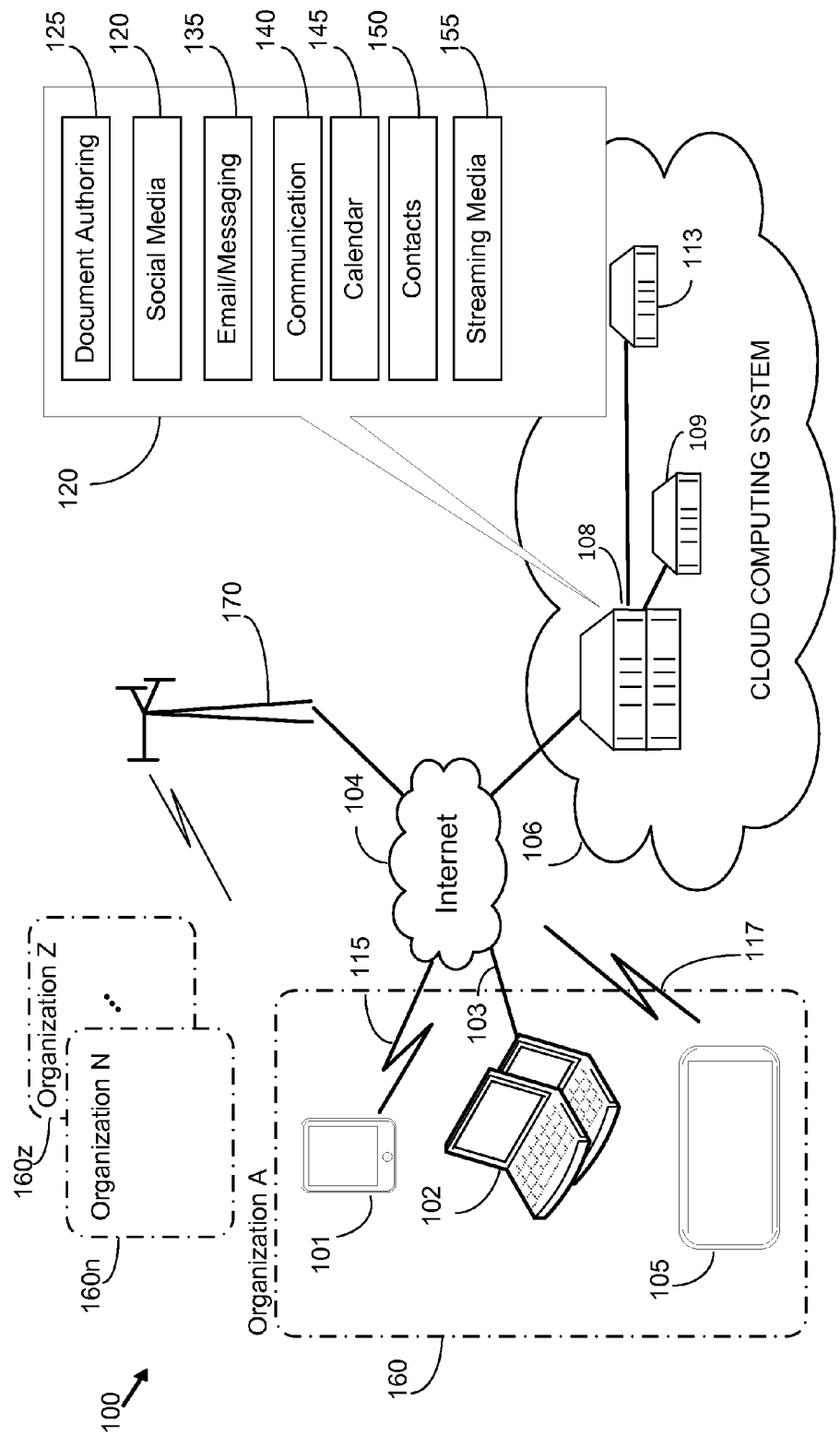
FIG. 1 is a schematic diagram showing one environment where users of an organization may utilize a CCS to receive services according to one embodiment presented herein.

In the following detailed description, references are made to the accompanying drawings that form a part hereof, and which are shown by way of illustration of specific embodiments or examples. Referring now to the drawings, in which like numerals represent like elements throughout the several figures, aspects are disclosed for managing capacity in a data center by suspending tenants.

The following detailed description is directed to suspending computing resources in a cloud computing system ("CCS") for a tenant. A CCS comprises various computing systems that collectively may be used to provide services to a tenant. Specifically, if no users of the tenant have used any of the services offered by the cloud CCS, certain computing resources may be conserved by suspending scheduled administrative processes in the CCS for the tenant.

One environment in which users may receive services from a CCS is shown in FIG. 1. FIG. 1 illustrates an environment that includes various organizations 160 and 160n-160z. These organizations can represent a virtual company, a physically situated business, a distributed business, a collection of users with a common interest or purpose, or any other group of affiliated users. These organizations comprise at least one individual user, and each user may employ a computing device, such as smart phone 101, laptop computer 102, or tablet computer 105. These computing devices, in turn, use various wired 103 or wireless connections 115, 117 to access the Internet 104. The Internet 104, in turn, may be used to provide access to the CCS 106.

The wireless connectivity for the computing devices can be based on various readily available technologies, including various cellular-based technologies (CDMA, GSM, 4G, EDGE, etc.) associated with the cellular infrastructure 170 provided by a cellular service provider. Other wireless technologies (e.g., WiMax, WiFi, etc.) can be used as well.

The wired technologies can be based on ISDN, cable modems, DSL, and other well-known technologies. Any of these communication technologies can provide connectivity from the computing device to the Internet 104.

The connectivity afforded by the wired and wireless communications through the Internet provides the computing devices 101, 102 or 105 with access to servers 108 in the CCS 106. Although the concepts illustrated herein may refer to a single server 108, there may be various servers accessed by users of a particular organization. For example, one server 108 accessed by a device may in turn direct the device to another server 113, or different users of the same organization may access different servers.

The server 108 may execute various application programs 120. These may be executed in a shared, disjoint, or distributed manner across one or more servers in the CCS 106. The application programs 120 may include a document authoring application 125 for creating documents, such as word processing programs. Other types of document authoring applications 125 may include spreadsheet programs, slide presentation programs, photo or graphical editing programs, etc.

The application programs 125 may also include social media applications 130 for group related messaging and communications. Another application program users may access is an email application 135 providing various messaging capabilities, including instant messaging. A communications application 140 may allow video chat or voice communication between users. A calendar application 145 may allow organizing meetings and events. A contact application 150 may allow organizing contact information for individuals. A streaming media application 155 may provide streaming digital data content, such as audio or video files. Further, each of these applications may store data, which the server 108 may maintain in a data store 109. The data store 109 can comprise various storage systems and technologies.

The application programs 125 can be used individually or collectively by users in an organization 160. For example, a user employing a smart phone 101 in an organization 160 may access the email application 135 in the CCS 106. Another user of the same organization employing a laptop 102 may also access the same email application 135. Such applications are frequently used by an organization to increase the productivity of its members. Although the organization 160 may employ hundreds or thousands of individuals, other organizations 160n-160z may involve a single individual or just a few individuals. There may be thousands of such organizations using the CCS.

Each of the organizations 160, 160n-160z is considered a tenant by the CCS-based computing services provider ("CSP"), and henceforth the organizations are referred to as "tenants." Each tenant typically contracts for receiving a specified service level, which may include a maximum amount of storage capacity, either in primary or secondary memory. Other service level aspects may provide for guaranteed up-time, which may necessitate the CSP to periodically perform database backups, and maintain spare processing units in case of failure or maintenance of components. Thus, the computing resources consumed by a tenant may be non-zero even if a user of the tenant is not accessing any services. The overall system computing resources may be limited by the number of tenants, regardless of the computational loads of each tenant.

For example, administrative processes may be periodically executed to determine the memory usage for a tenant. Executing this administrative process for a tenant requires computational resources that cannot then be used to provide services a user. The administrative processes execute even if no users of the tenant are logged-on to the CCS.

In some instances, the users of a tenant may not access the CCS for extended periods of time. This is often the case if the tenant comprises a small number of users. The users may be on vacation, or may only use an application on an infrequent basis (e.g., once a month). For whatever reason, there may be periods when the users of the organization do not use the services of the CCS.

Figure 2:
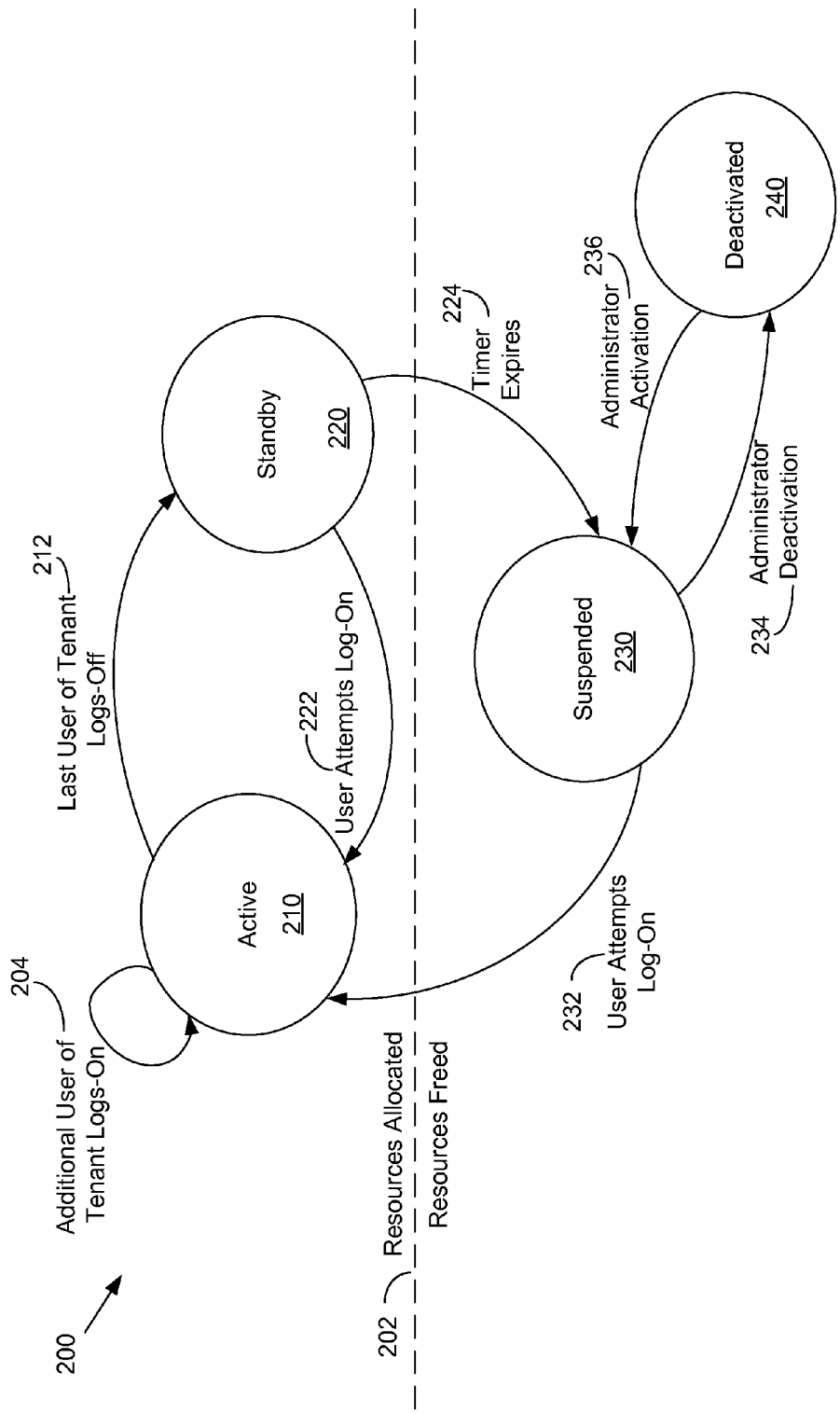
FIG. 2 is a depiction of a state diagram showing when CCS resources associated with a tenant are suspended in certain conditions.

In such instances, the CCS can increase system capacity by suspending the tenant along with any associated administrative processes executed for the tenant when no users of the tenant are using the CCS. The various states in one embodiment associated with a tenant are shown in FIG. 2. As will be seen, other embodiments may define fewer or additional states.

Turning to FIG. 2, the state diagram 200 shows various states 210, 220, 230, and 240 that a tenant can be categorized in. The dotted line 202 separates states 210, 220 where various tenant-specific administrative computing resources are executing, from the states 230, 240 where tenant-specific administrative computing resources are suspended. FIG. 2 depicts one embodiment of how various states can be transitioned based on user actions (or lack thereof).

Starting with the Active State 210, this state represents the normal state of a tenant that is using applications in the CCS. In this state, at least one user of the tenant is currently using an application. If another user of the tenant logs-on to the CCS as represented by action 204, then the tenant remains classified in the Active State 210.

Once the last user of the tenant logs-off 212 from the CCS, the tenant is classified as being in the Standby State 220. The tenant has not been suspended at this point, but if no users associated with the tenant log-on within a timer period, the tenant will be suspended. In one embodiment, when the Standby State 220 is entered, a timer may be started or the system may periodically check a user history log to ascertain when the last user of the tenant used the system. If a user logs-on 222 in this state, the tenant is classified as being back in the Active State 210.

Assuming that the tenant is in the Standby State 220, if the timer expires 224 (or examination of the user history log indicates the tenant has not used the service for a certain amount of time), then the tenant is categorized as being in the Suspended State 230. In this state, the CCS 106 can suspend various administrative processes associated with the tenant. The time duration before suspension is triggered can be defined in several ways. First, a system wide parameter can be defined by the CCS administrator that applies regardless of the tenant and load conditions. In another embodiment, the time duration value can be adjusted based on CCS usage. If the CCS resources are under a relatively heavy load, the time duration may be shortened. This would result in more aggressively suspending tenants that infrequently use the CCS. Conversely, if CCS resources are under a relatively lighter load, the time duration may be lengthened. This time duration adjustment could be manually performed by the CCS administrator or the time duration could be dynamic—e.g., it could be automatically performed by the CCS based on a determination of its system load. In other embodiments, different time durations could be defined for different tenants and/or load conditions.

The tenant will remain in the Suspended State 220 until one of two actions occurs. First, the CCS administrator can deactivate 234 the tenant and place the tenant in a Deactivated State 240. In this state, no user can log back onto the system. If a user attempts to log-on, a service denial message will be presented in response to their attempt. The tenant can be returned to the Suspended State 230 by administrator activation 236, which may occur in a manual manner.

Second, the tenant can move from the Suspended State 230 when a user attempts to log-on 232. This places the tenant back into the Active State 210. When a user attempts to log-on 232 from the Suspended State 230, the CCS reinstates the various administrative processes of the tenant before allowing the user to complete the log-on. Reinstating the various background and administrative processes occurs very quickly such that the user does not perceive any delay. Once reinstated, the administrative processes can execute as normal and as scheduled.

In other embodiments, the Standby State 220 may be eliminated. Specifically, the tenant would be either in the Active State 210, the Suspended State 230, or Deactivated State 240. In these embodiments, the tenant remains in the Active State 210 even when the last user of the tenant logs-off, and only moves to the Suspended State 230 once the time period since the last user logged-off exceeds a threshold level. In other words, the transition from the Active State 210 to Suspended State 230 would occur when no users of the tenant have access the system for a specific time period.

It should also be noted that the state transition diagram of FIG. 2 is for modeling the operation of the system and implementation of a state transition model is not necessary to practice the concepts disclosed herein. Further, other variations of the state transitions what are described above are possible.

For example, in other embodiments, it may be possible for a tenant to move from the Active State 210 to the Deactivated State 240 directly, bypassing the Standby State 220 and the Suspended State 230. A tenant may be directly deactivated by a cloud computing system administrator in certain conditions. In general, the CCS administrator can force a tenant to transition from any state to any state. Thus, the tenant could be forced from the Active State 210 to the Suspended State 230 or the Deactivated State. For example, the tenant may have cancelled their services to the cloud computing system, the service agreement may have expired, or the service agreement may have been deactivated for breach of the terms of the service agreement by the tenant. Other transitions, such as from the Deactivated State 240 to the Active State 210, are possible. Thus, there are numerous alternative state transitions that may be implemented to reflect commercial service offerings. The state transitions in FIG. 2 have focused on procedures for suspending resources.

Figure 3A:
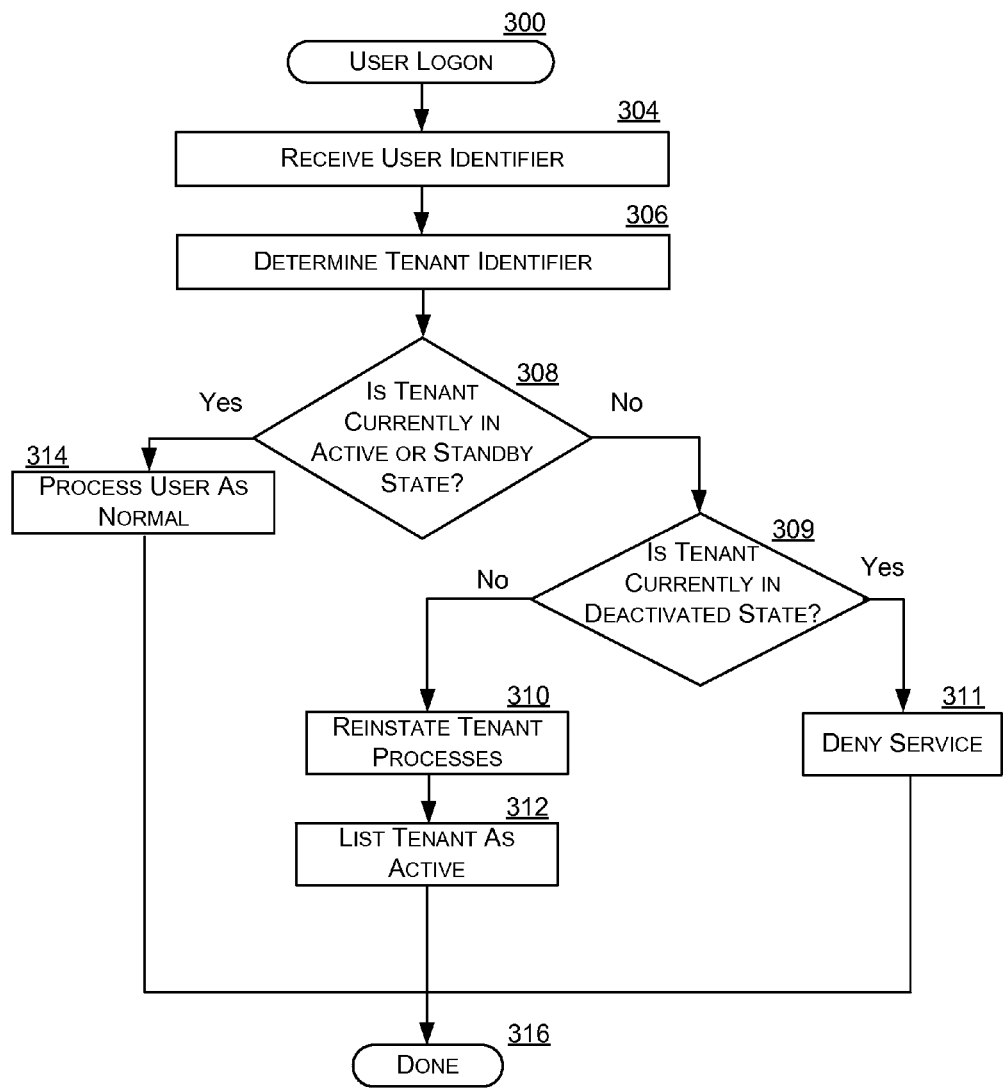
FIGS. 3A and 3B depict a process flow for suspending computing resources associated with a tenant's usage of the CCS.
Figure 3B:
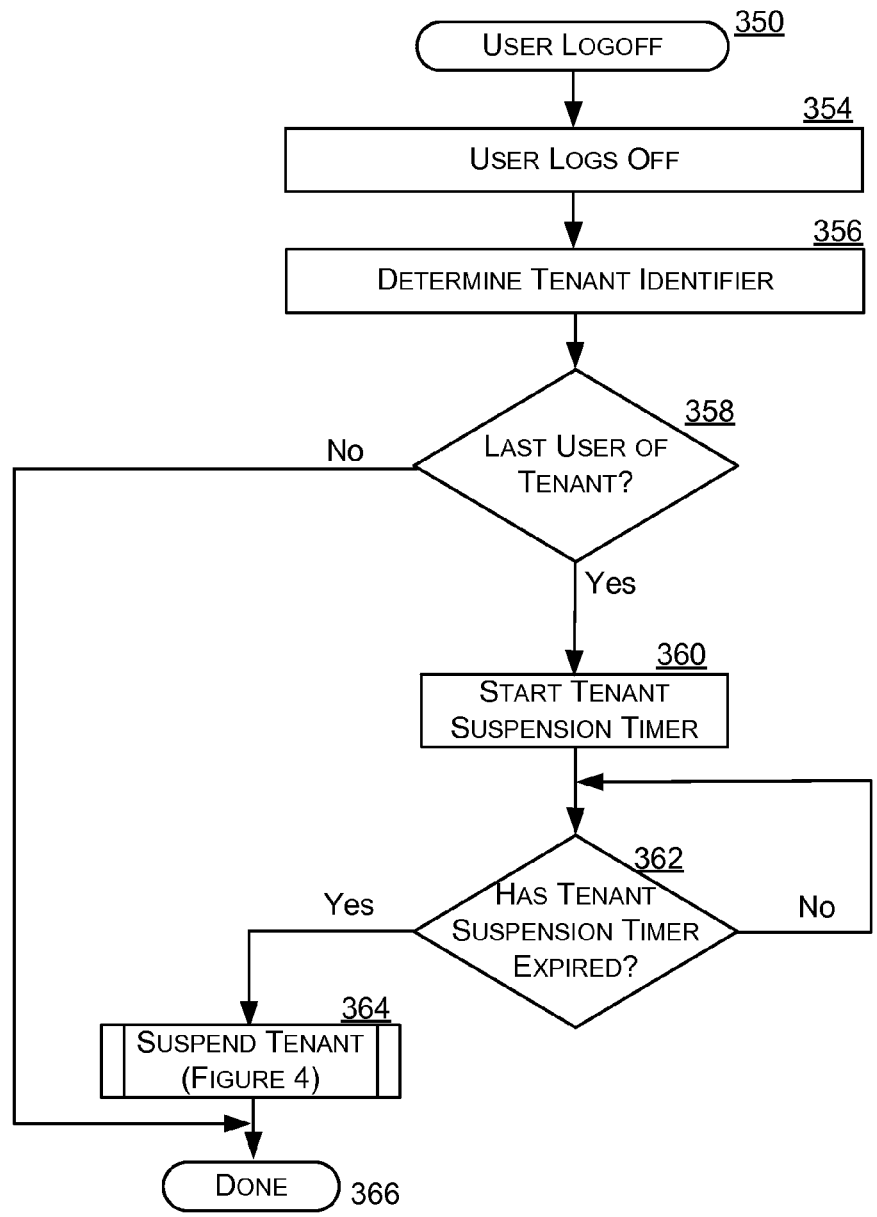

The transition from the above-defined states can also be described as a process flow illustrated in FIGS. 3A and 3B. It should be appreciated that the logical operations described herein with respect to FIGS. 3A and 3B and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the figures and described herein. These operations may also be performed in a different order than those described herein.

The process flows shown in FIGS. 3A and 3B disclose a process flow associated with the user logging-on to the CCS and a user logging-off of the CCS, respectively. Turning to FIG. 3A, the user log-on process flow 300 begins with the system receiving a user identifier in operation 304. This allows the tenant identifier to be determined in operation 306. The tenant identification can be accomplished using a tenant identifier table, which is a data structure facilitating associating the user identifier with a tenant identifier in a table entry.

In operation 308, a determination is made using the tenant state table whether the tenant is currently in the Active State 210 or Standby State 220. A state table for each tenant can be maintained and updated as needed in response to the action described above for FIG. 2. The Active State 210 occurs if another user associated with the tenant has already logged in and is accessing services. The Standby State 220 is indicative of another user recently using the CCS services, but having logged-off. If the tenant is in either the Active State 210 or Standby State 220, then in operation 314 the system processes the user log-on as normal. There are no administrative processes to reinstate because none were suspended.

If, in operation 308, it is determined that the tenant is not in an Active State 210 or Standby State 220, then the determination occurs in operation 309 as to whether the tenant is in the Deactivated State 240. If the tenant is the Deactivated State 240, then in operation 311 service is denied to the user. The user may be provided with a message indicating that the tenant organization is not active, to contact the system administrator for further assistance, or some other type of message. Once a tenant is in a Deactivated State 240, the administrator may be required to manually reinstate the tenant. If in operation 309 it is determined the tenant is not in the Deactivated State 240, then the tenant is in the Suspended State 230. Various administrative processes must be restarted before the tenant can be considered in the Active State 210. Once these processes are restarted in operation 310, the tenant is listed as in the Active State in operation 312. The process completes in operation 316 and the user's log-on processing is handled as normal.

The process for processing a user logging-off is shown in FIG. 3B. Turning to FIG. 3B, the log-off process 350 begins with the user logging-off in operation 354. In operation 356, the associated tenant identifier is used to determine the tenant the user is associated with. In operation 358, a determination is made whether the user was the last user of that tenant to log-off. If the answer is no, then the process is done at operation 366.

If the user was the last user of the tenant that was logged onto the system, then a tenant suspension timer is started in operation 360. In operation 362, the tenant suspension timer is checked to see whether it has expired. If it has not, then the process loops back and it is continuously checked, until it expires. Once it expires, then operation 364 is performed. The process of suspending the tenant is completed and the process ends in operation 366.

It is not required in operation 362 that every embodiment use a timer to ascertain the tenant has not been using the CCS services for a specified time. Another embodiment could instead periodically check a tenant history log for the last time a user associated with a tenant accessed the CCS services. The log would store the time each user logged on, and this history log could be periodically analyzed. If none of the tenant's users have accessed the CCS, then the tenant can be suspended.

Figure 4:
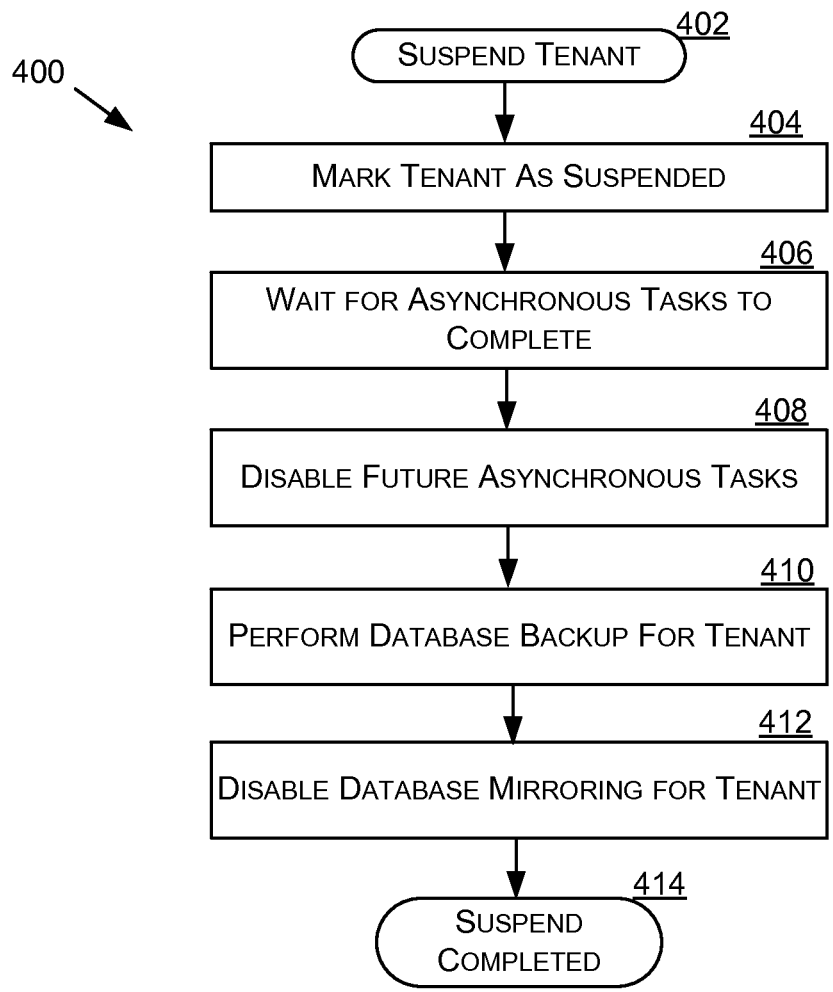
FIG. 4 is a process flow illustrating operations associated with suspending a tenant by a CCS service provider.

The process flow for suspending a tenant 400 by a CCS is shown in FIG. 4. The process begins in operation 404 with marking the tenant in a tenant state table as suspended. This may use a table-based data structure associating the tenant with a status indicator that indicates the current state of the tenant, e.g., whether the tenant is in the Active State or Suspended State.

In operation 406, the CCS waits for the completion of any pending administration processes. These may be in the form of asynchronous tasks associated with the tenant. One example of an asynchronous task is a memory management process that determines the data storage level used by, or available for use to, a tenant. This administration process may execute periodically for each tenant. In one embodiment, this process may be scheduled for execution every five minutes for each tenant. This administration process determines the current memory used by a tenant, and compares the memory used to the maximum allocated for the tenant. This information can be made available to the tenant for assisting in determining service levels.

In operation 408, any such scheduled asynchronous tasks are disabled or otherwise prevented from recurring until the tenant is in the Active State. Disabling these tenant-specific processes allows the benefits of conserving computing resources to be realized. In one embodiment, the asynchronous tasks comprise administrative tasks which are not in the direct control of the user or tenant, such as the aforementioned memory management or backup processes. Other asynchronous tasks may comprise application level tasks. These may or may not be within the direct control of the user or tenant. These tasks are oriented around a particular business application. These could include, for example, email-reminders, database management, generating scheduled reports, etc. A tenant may find it acceptable to suspend these types of tasks when the tenant is in a Suspended State. The tenant may negotiate for such tasks to be suspended as part of their service level agreement with the cloud computing service provider. Different service level agreements may define which, when, and how asynchronous tasks are suspended when the tenant is in a Suspended State.

In operation 410, the CCS performs a backup of the tenant's data in a backup database. This ensures that a current copy is maintained and available when the tenant is reinstated to the Active State. In operation 412, any future mirroring processing for the tenant is similarly disabled.

Once the above operations are completed, the tenant suspension is complete. The above operations can be performed in a different order, and may comprise additional operations. In some embodiments, not all the above operations may be performed. However, to realize the benefits of conserving computing resources, at least some administration processes that would otherwise be performed are disabled for the tenant.

The process for restoring the tenant to the Active State of a tenant is largely the reverse of the operations shown in FIG. 4. The time period for restoring a tenant occurs fast enough that a user logging-on to the system will not incur a noticeable delay.

Figure 5:
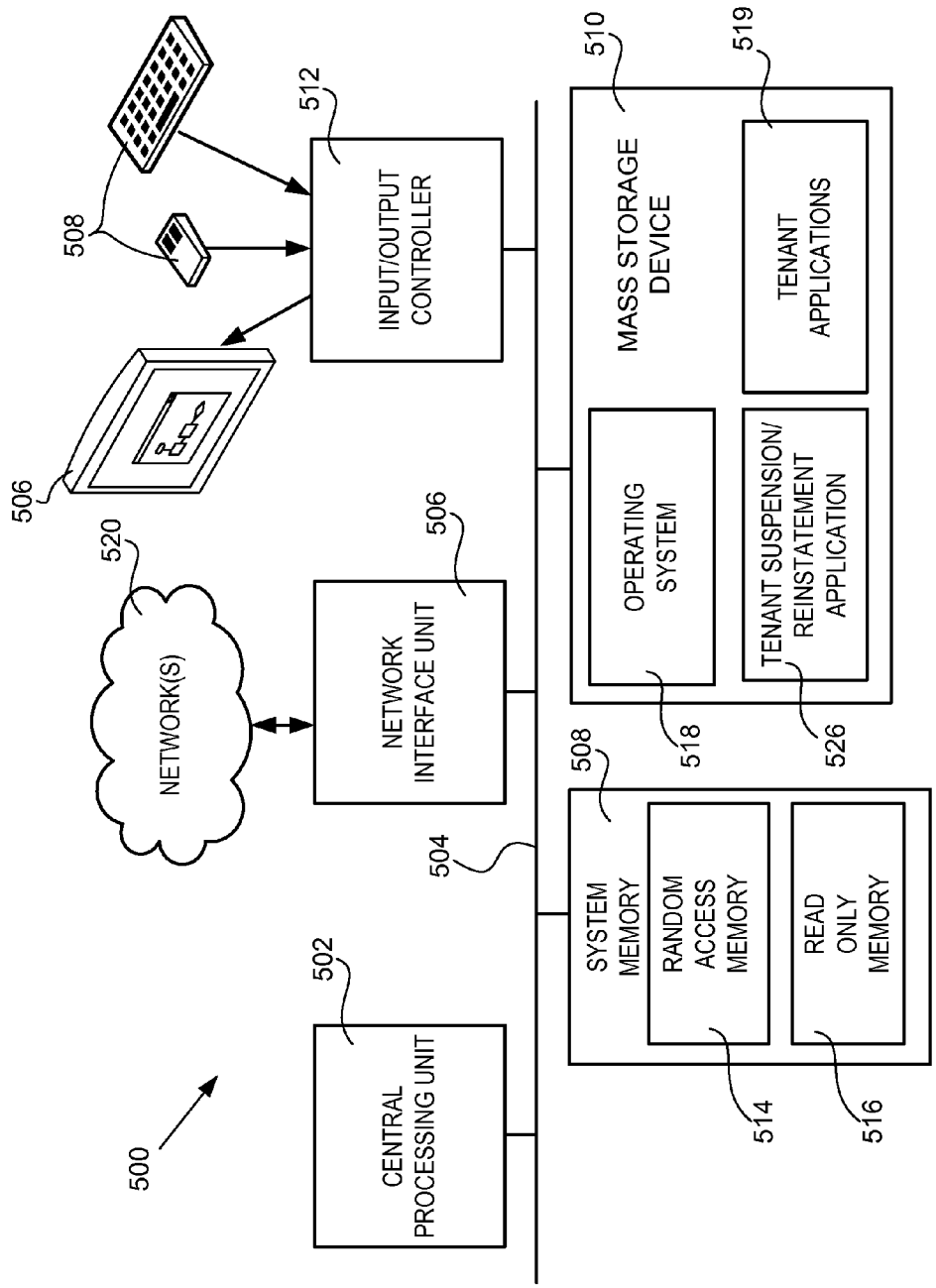
FIG. 5 illustrates a computer architecture for a computing device in a CCS configured to perform the operations for suspending a tenant.

The process flow described above and other related functions can be implemented in one embodiment by the computing architecture of a computer device 500 as shown in FIG. 5. FIG. 5 shows an illustrative computing architecture for a computing processing device capable of executing the processes described. Although FIG. 5 describes the computing device such as server 108, the architecture shown in FIG. 5 may illustrate a desktop computer, a smart phone 101, laptop 102, or tablet computer 105, or other type of computer utilized to execute any aspect of the processes presented herein. Other architectures or computers may be used to execute the software components presented herein.

The computer architecture shown in FIG. 5 includes a processor 502 (also referred to herein as a centralized processing unit or "CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the server 500, such as during startup, is stored in the ROM 516. The computer 500 further includes a mass storage device 510 for storing an operating system 518, application programs, and other program modules, as described herein.

The mass storage device 510 is connected to the CPU 502 through a mass storage controller (not shown), which in turn is connected to the bus 504. The mass storage device 510 and its associated computer-readable media provide non-volatile storage for the processing device 500. Although the description of computer-readable media contained herein refers to a mass storage device, such as a hard disk or CD-ROM drive, it should be appreciated by those skilled in the art that computer readable media can be any available computer readable storage media that can be accessed by the computer 500.

The computer readable media may be any available media that can be accessed by the computer 500, including computer readable storage media and communications media. Communications media includes transitory signals. Computer readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the processing device 500. Computer readable storage media does not encompass transitory signals.

According to various embodiments, the processing device 500 may operate in a networked environment using logical connections to remote computers or other servers through a network 520. The processing device 500 may wirelessly connect to the network 520 using an antenna (not shown) or using wired connections. In other embodiments, connection to other types of network may be accomplished using an input/output controller 512. The input/output controller 512 can be used for receiving and processing input from a number of other devices 508, including a keyboard, mouse, or electronic stylus (not shown in FIG. 5). Similarly, an input/output controller 512 may provide output to a display screen 506, a printer, or other type of output device (also not shown in FIG. 5). In one embodiment, the computing device may incorporate a display screen 506 comprising a touch screen display. The touch screen display functions to not only display information, but also to receive input from the user, including inputting text, commands, and controls.

As mentioned briefly above, a number of applications or program modules and data files may be stored in the mass storage device 510 and RAM 514 of the processing device 500, including an operating system 518 suitable for controlling the operation of a server or other type of computer. The mass storage device 510 and RAM 514 may also store one or more program modules or data files. In particular, the mass storage device 510 and the RAM 514 may store the tenant suspension/reinstatement application 526. The tenant suspension/reinstatement application 526 contains instructions that when executed cause a processor to perform the processes disclosed above. Further, the mass storage device 510 and RAM 514 may also store tenant applications 519 that provide services to the users of the tenants.

It should be appreciated that the software components described herein may, when loaded into the processor 502 and executed, transform the processor 502 and the overall processing device 500 from a general-purpose computing system into a special-purpose computing system customized to facilitate the functionality presented herein. The processor 502 may be constructed from any number of transistors or other discrete circuit elements, which may individually or collectively assume any number of states. More specifically, the processor 502 may operate as a finite-state machine, in response to executable instructions contained within the software modules disclosed herein. These computer-executable instructions may transform the processor 502 by specifying how the processor 502 transitions between states, thereby transforming the transistors or other discrete hardware elements constituting the processor 502.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the processing device 500 in order to store and execute the software components presented herein. It also should be appreciated that the processing device 500 may comprise other types of computing devices, including hand-held computers, embedded computer systems, personal digital assistants, and other types of computing devices known to those skilled in the art. It is also contemplated that the processing device 500 may not include all of the components shown in FIG. 5, may include other components that are not explicitly shown in FIG. 5, or may utilize an architecture completely different than that shown in FIG. 5.

It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computing device for conserving computing resources in a cloud computing system, comprising:
   a central processing unit;
   a system memory; and
   a mass storage device, the mass storage device having computer-executable instructions which, when loaded into the system memory and executed by the central processing unit, cause the computing device to
      initiate at least one administrative computing process for a tenant in the cloud computing system, the tenant associated with one or more users;
      determine that no user of the tenant has used the cloud computing system within a period of time;
      wait for the at least one administrative computing process for the tenant in the cloud computing system to complete;
      suspend the tenant and indicating the tenant as suspended in the cloud computing system, in response to determining that no user of the tenant has used the cloud computing system within the period of time;
      receive a request from a user of the tenant;
      determine that the tenant is suspended; and
      allow the at least one administrative computing process for the tenant to be reinstated.

2. The computing device of claim 1, wherein determining that no user of the tenant has used the cloud computing system within a period of time comprises:
   periodically accessing a user history log; and
   determining that a time since last user of the tenant has logged-off from the cloud computing system exceeds a defined limit.

3. The computing device of claim 1, wherein determining that no user of the tenant has used the cloud computing system within a period of time comprises:
   accessing a timer associated with the tenant, the timer indicating the duration since a last user of the tenant has logged-off; and
   determining that the timer is greater than a predetermined value.

4. The computing device of claim 1, wherein the at least one administrative computing process comprises a process determining a level of memory storage utilized by stored data associated with the tenant.

5. The computing device of claim 4, wherein the computer-executable instructions cause the computing device to perform a memory backup of the stored data prior to indicating the tenant as suspended in the cloud computing system.

6. The computing device of claim 1, wherein the computer-executable instructions cause the computing device to modify a tenant state indication associated with a tenant state table to indicate that the tenant is in an active state.

7. A computing device for conserving computing resources in a cloud computing system, comprising:
   a central processing unit;
   a system memory; and
   a mass storage device, the mass storage device having computer-executable instructions which, when loaded into the system memory and executed by the central processing unit, cause the computing device to
      initiate an asynchronous computing process for a tenant in a cloud computing system, the tenant associated with one or more users,
      determine that no user of the tenant has used the cloud computing system within a period of time,
      wait for the asynchronous computing process for the tenant in the cloud computing system to complete execution,
      suspend the tenant and indicate the tenant in a tenant state table as being in a suspended state in the cloud computing system, if no user of the tenant has used the cloud computing system within the period of time,
      receive a request from a user of the tenant,
      determine that the tenant is indicated as in the suspended state in the tenant state table, and
      allow the at least one asynchronous computing process for the tenant to execute.

8. The computing device of claim 7, further storing instructions that when executed cause the computing device to update the tenant state table to indicate the tenant as being in an active state in response to the request.

9. The computing device of claim 7, further storing instructions that when executed cause the computing device to:
   periodically access a user history log;
   determine a time duration since when a last user of the tenant has logged-off from the cloud computing system exceeds a time limit, wherein the time duration is dynamically determined based on a cloud computing system load; and
   update the tenant state table stored in memory to indicate the tenant as being in a suspended state, in response to determining the time duration since the last user of the tenant has logged-off from the cloud computing system exceeds the time limit.

10. The computing device of claim 7, further storing instructions that when executed cause the computing device to:
    access a timer associated with the tenant, the timer indicating a duration since a last user of the tenant has logged-off from the cloud computing system,
    determine that the timer is greater than a predetermined value, and
    update a tenant state table from memory to indicate the tenant as being in a suspended state, in response to determining that the timer is greater than a predetermined value.

11. The computing device of claim 7, further storing instructions that when executed cause the computing device to perform a memory backup of stored data of the tenant prior to indicating the tenant as being in a suspended state.

12. The computing device of claim 7, further storing instructions that when executed cause the computing device to access a user history log to determine that no user of the tenant has used the cloud computing system for a period of time.

13. A method for conserving computing resources in a cloud computing system, comprising:
    initiating an asynchronous computing process for a tenant in a cloud computing system, the tenant associated with one or more users;
    determining that no user of the tenant has used the cloud computing system within a period of time;
    waiting for the asynchronous computing process for the tenant in the cloud computing system to complete execution;
    suspending the tenant and indicate the tenant in a tenant state table as being in a suspended state in the cloud computing system, if no user of the tenant has used the cloud computing system within the period of time;
    receiving a log-on request from a user of the tenant;
    determining that the tenant is indicated as in the suspended state in the tenant state table; and
    allowing the at least one asynchronous computing process for the tenant to execute.

14. The method of claim 13, further comprising updating the tenant state table to indicate the tenant as being in an active state in response to the request.

15. The method of claim 13, further comprising:
    accessing a user history log;
    determining a time duration since when a last user of the tenant has logged-off from the cloud computing system exceeds a time limit, wherein the time duration is dynamically determined based on a cloud computing system load; and
    updating the tenant state table stored in memory to indicate the tenant as being in a suspended state, in response to determining the time duration since the last user of the tenant has logged-off from the cloud computing system exceeds the time limit.

16. The method of claim 13, further comprising:
    accessing a timer associated with the tenant, the timer indicating a duration since a last user of the tenant has logged-off from the cloud computing system,
    determining that the timer is greater than a predetermined value, and
    updating a tenant state table from memory to indicate the tenant as being in a suspended state, in response to determining that the timer is greater than a predetermined value.

17. The method of claim 13, further comprising performing a memory backup of stored data of the tenant prior to indicating the tenant as being in a suspended state.

18. The method of claim 13, further comprising determining that no user of the tenant has used the cloud computing system for a period of time.

* * * * *